United States Patent Office 2,844,627
Patented July 22, 1958

2,844,627

PRODUCTION OF HALOACIDS

Herman D. Noether, Kew Gardens, N. Y., assignor to Celanese Corporation of America, New York, N. Y., a corporation of Delaware No Drawing. Application March 16, 1953
Serial No. 342,717

12 Claims. (Cl. 260—539)

This invention relates to the production of halocarboxylic acids and relates more particularly to the production of chlorocarboxylic acids from cyclic ketones.

It is an object of this invention to provide a new and improved process for the production of haloacids from cyclic ketones in good yields.

A further object of this invention is the provision of a novel process for the production of halocarboxylic acids using cheap and easily handled starting materials, which process is capable of being operated continuously to furnish good yields of such acids.

A more particular object of this invention is to provide a new and improved process for producing chlorocaproic acid from cyclohexanone.

Other objects of this invention will be apparent from the following detailed description and claims.

According to my invention, a cyclic ketone is reacted with a mixture of aqueous hydrogen peroxide and sulfuric acid, and the resulting crude reaction product is reacted with a haloacid, such as hydrochloric acid or hydrobromic acid.

The reaction of the cyclic ketone with the hydrogen peroxide and sulfuric acid results in the conversion of the ketone to the corresponding lactone in high yields. I have found that in this reaction it is important to maintain the temperature at 30° C. or above during the mixing of the reactants, since lower temperatures cause the formation of undesirable peroxides. For optimum results the temperature should be maintained within the range of 35 to 45° C.

I have found it to be desirable to carry out the reaction of the ketone with the hydrogen peroxide and sulfuric acid by adding the ketone slowly and continuously to a mixture of the peroxide and the acid while agitating the mixture strongly to avoid local overheating. Slow continuous addition provides much better control over the reaction than dropwise addition of the ketone. Still better control is attained by carrying out the reaction in the presence of an appreciable amount of a lactone-containing mixture resulting from the previous reaction of the same reactants. Thus, I have found that the initial reaction, which may be rather violent, may be controlled much more easily when, prior to the addition of the cyclic ketone, the peroxide and acid are mixed with about 10% to 25%, based on the weight of the peroxide and acid, of the mixture resulting from a previous reaction of the ketone, peroxide and acid. The initial reaction may also be moderated by adding the first portion of the cyclic ketone in the form of a mixture of said ketone with concentrated sulfuric acid. Care should be taken to maintain the latter mixture at a reduced temperature during its preparation and to use it promptly in order to avoid undesirable side reactions between the ketone and the sulfuric acid. As an example, 30% of the total quantity of cyclohexanone, or other cyclic ketone, may be mixed with concentrated sulfuric acid in the proportion of about 1 part by weight of ketone to 2 parts by weight of sulfuric acid, while cooling to 10° C., and the resulting cool mixture may be added gradually, with agitation, to the mixture of hydrogen peroxide and sulfuric acid. Thereafter the remaining 70% of the cyclic ketone may be added gradually to the reaction mixture without first mixing said ketone with the sulfuric acid.

The hydrogen peroxide may be supplied in the form of an aqueous solution thereof, such as an aqueous solution of 20 to 60% or even 90% concentration. The sulfuric acid, which is preferably in the form of concentrated sulfuric acid, e. g. 98% sulfuric acid, is mixed with the aqueous hydrogen peroxide to produce a mixture in which the ratio of $H_2O_2$ to $H_2SO_4$ may vary over a wide range. For example, one volume of 30% or 50% aqueous hydrogen peroxide may be mixed with about 2 to 20 volumes of concentrated sulfuric acid. Preferably about 2 volumes of the latter are employed for each volume of the 30% to 50% aqueous hydrogen peroxide, since such a proportion yields the most desirable results during the reaction and also provides a crude reaction mixture which reacts most favorably with the haloacid in the second stage of the reaction. It is desirable to employ an excess of hydrogen peroxide so that for each mole of the cyclic ketone there is present more than one mole, e. g. 1.1 to 1.25 moles, of hydrogen peroxide. During the reaction the hydrogen peroxide is converted to water. In order to avoid the formation of undesired organic peroxides, the reactants should be so proportioned that the water content of the mixture is maintained, throughout the reaction, at a value which is not above about 40% by volume, based on the volume of the sulfuric acid, hydrogen peroxide and water.

After all of the cyclic ketone, hydrogen peroxide and sulfuric acid have been mixed, the reaction is continued, preferably until the ketone has been reacted completely. The residual hydrogen peroxide remaining in the mixture is then destroyed, e. g. by adding gaseous sulfur dioxide to the mixture at room temperature. If desired, any excess sulfur dioxide present in the mixture after this treatment may be removed as by blowing nitrogen, or other inert gas, through the mixture.

The crude lactone-containing reaction mixture obtained from the reaction of the cyclic ketone, hydrogen peroxide and sulfuric acid is then, without further purification, reacted with hydrochloric acid. Optimum results are obtained when this reaction with hydrochloric acid is carried out at a temperature of at least about 100° C., preferably higher, e. g. 130° to 170° C. The reactants are preferably maintained in liquid phase in a closed vessel under autogenous pressure during this reaction. With respect to the amount of hydrochloric acid employed in the reaction, it is desirable to have present at least one mole of this acid per mole of lactone contained in the crude mixture obtained by the reaction of the ketone, peroxide, and sulfuric acid. Since the latter reaction produces an almost quantitative yield of lactone, this amount of hydrochloric acid is at least one mole per mole of cyclic ketone used in said reaction. For best results, an excess of hydrochloric acid should be present, e. g. about 3 to 10 moles of hydrochloric acid per mole of cyclic ketone. The hydrochloric acid is provided most conveniently in the form of concentrated hydrochloric acid (36–38%).

One highly satisfactory method of carrying out the reaction with hydrochloric acid is to add the crude lactone-containing mixture to the concentrated hydrochloric acid at a reduced temperature, e. g. 0° to 3° C., and to heat the resulting mixture in a closed vessel at 100° C. or higher. As the reaction proceeds the chloro acid separates out of the reaction mixture as a second liquid phase, which may be removed in any convenient manner.

When the corresponding bromocarboxylic acid is desired the hydrochloric acid is replaced by hydrobromic acid and the reaction is carried out in the same manner, except that the reaction need not take place under superatmospheric pressure and may also be carried out at somewhat lower temperatures.

The cyclic ketone employed in the reaction of my invention contains a carbonyl group in the ring. Examples of such ketones which may be used are carbocylic ketones having 5-, 6-, or 7-membered rings, e. g. cyclohexanone, cyclopentanone, suberone, menthone, 2-methyl cyclohexanone, and other substituted cyclic ketones.

The invention is illustrated by the following examples:

Example I 735 parts by weight of concentrated sulfuric acid (98% $H_2SO_4$) are added slowly to 223 parts by weight of an aqueous solution of hydrogen peroxide of 30% concentration while the temperature is maintained at or below 20° C. by cooling. To this mixture is added 20% of its weight of a crude mixture obtained by the reaction, in the same manner as described below, of hydrogen peroxide, sulfuric acid and cyclohexanone. The resulting mixture is warmed until its temperature is about 30° C. and then 168 parts by weight of cyclohexanone are added thereto, while said mixture is agitated vigorously. The addition of cyclohexanone is carried out slowly and continuously over a period of 60 minutes. During this addition the reaction mixture is maintained at 35 to 40° C. by applying an ice bath to the vessel containing the reactants and by regulating the rate of addition of the cyclohexanone. After the addition of the cyclohexanone is complete the reaction mixture, which has turned dark brown, is allowed to stand for 5 to 15 hours at room temperature for the reaction to proceed to completion. Completion of the reaction is indicated when the brown color disappears and the mixture assumes a pale yellow color. At the end of this period of time, gaseous sulfur dioxide is bubbled through the mixture to destroy any residual peroxide and then nitrogen is bubbled through the mixture to remove the excess sulfur dioxide. The resulting crude reaction mixture is added to 720 parts by weight of concentrated hydrochloric acid, containing 37% HCl and maintained at 0 to 3° C., and then heated in a closed vessel at 100° C. for 15 hours, during which period of time the mixture separates into two layers. The 6-chlorocaproic acid, contained in the upper layer, is separated from the whole reaction mixture by cooling said mixture to room temperature, pouring the cooled mixture on cracked ice, mixing in a salt, such as sodium chloride, to improve the separation of the components by the salting out effect, adding ether to the cold, salted mixture, separating the upper layer from the mixture and distilling the ether from this separated upper layer. A 90% yield of about 85% pure 6-chlorocaproic acid is obtained.

Example II

Example I is repeated with the exception that the 223 parts by weight of 30% hydrogen peroxide are replaced by 240 parts by weight of a 50% aqueous solution of hydrogen peroxide. Substantially the same results are obtained.

It is to be understood that the foregoing detailed description is given merely by way of illustration and that many variations may be made therein without departing from the spirit of my invention.

Having described my invention, what I desire to secure by Letters Patent is:

1. Process for the production of a halocarboxylic acid from a cyclic ketone, which comprises oxidizing a ketone which is an oxo-substituted hydrocarbon having its keto carbonyl group in a cycloparaffinic ring of 5 to 7 carbon atoms with an aqueous mixture of hydrogen peroxide and sulfuric acid to produce a reaction product containing a lactone and said sulfuric acid, the reactants being maintained at a temperature of at least about 30° C. during the mixing of said ketone, hydrogen peroxide and sulfuric acid, and reacting a hydrohalogen acid selected from the group consisting of hydrochloric and hydrobromic acids with said reaction product to produce a halocarboxylic acid.

2. Process for the production of a chlorocarboxylic acid from a cyclic ketone, which comprises oxidizing a ketone which is an oxo-substituted hydrocarbon having its keto carbonyl group in a cycloparaffinic ring of 5 to 7 carbon atoms with an aqueous mixture of excess hydrogen peroxide and sulfuric acid, the reactants being maintained at a temperature of at least about 30° C. during the mixing of said ketone, hydrogen peroxide and sulfuric acid, thereafter eliminating the excess peroxide to produce a reaction product containing a lactone and said sulfuric acid, and reacting hydrochloric acid with said reaction product to produce a chlorocarboxylic acid.

3. Process for the production of a chlorocarboxylic acid from a cyclic ketone, which comprises oxidizing a ketone which is an oxo-substituted hydrocarbon having its keto carbonyl group in a cycloparaffinic ring of 5 to 7 carbon atoms with an aqueous mixture of hydrogen peroxide and sulfuric acid to produce a reaction product containing a lactone and said sulfuric acid, the reactants being maintained at a temperature of at least about 30° C. during the mixing of said ketone, hydrogen peroxide and sulfuric acid, and reacting hydrochloric acid with said reaction product at a temperature above about 100° C. to produce a chlorocarboxylic acid.

4. Process for the production of a chlorocarboxylic acid from a cyclic ketone, which comprises oxidizing a ketone which is an oxo-substituted hydrocarbon having its keto carbonyl group in a cycloparaffinic ring of 5 to 7 carbon atoms with an aqueous mixture of hydrogen peroxide and sulfuric acid to produce a recation product containing a lactone and said sulfuric acid, the reactants being maintained at a temperature of at least about 30° C. during the mixing of said ketone, hydrogen peroxide and sulfuric acid, and reacting hydrochloric acid with said reaction product under superatmospheric pressure and at a temperature above about 100° C. to produce a chlorocarboxylic acid.

5. Process for the production of a chlorocarboxylic acid from a cyclic ketone, which comprises oxidizing a ketone which is an oxo-substituted hydrocarbon having its keto carbonyl group in a cycloparaffinic ring of 5 to 7 carbon atoms with an aqueous mixture of hydrogen peroxide and sulfuric acid, the reactants being maintained at a temperature of at least about 30° C. during the mixing of said ketone, hydrogen peroxide and sulfuric acid, to produce a reaction product containing a lactone and said sulfuric acid, and reacting hydrochloric acid with said reaction product to produce a chlorocarboxylic acid.

6. Process for the production of a chlorocarboxylic acid from a cyclic ketone, which comprises producing a reaction product containing a lactone and sulfuric acid by adding a ketone which is an oxo-substituted hydrocarbon having its keto carbonyl group in a cycloparaffinic ring of 5 to 7 carbon atoms to an aqueous mixture of hydrogen peroxide and sulfuric acid, said mixture being maintained at a temperature of at least 30° C. and containing throughout said addition at least about 10%, based on the weight of said aqueous mixture, of a lactone-containing mixture produced by the oxidation of said ketone with aqeous sulfuric acid and hydrogen peroxide, and reacting hydrochloric acid with said reaction product to produce a chlorocarboxylic acid.

7. Process for the production of a chlorocarboxylic acid from a cyclic ketone, which comprises oxidizing a ketone which is an oxo-substituted hydrocarbon having its keto carbonyl group in a cycloparaffinic ring of 5 to 7 carbon atoms with an aqueous mixture of excess hydrogen peroxide and sulfuric acid and eliminating the excess peroxide, the reactants being maintained at a temperature of at least about 30° C. during the mixing of said ketone, hydrogen peroxide and sulfuric acid, to produce a reaction product containing a lactone and said sulfuric acid, and reacting hydrochloric acid with said reaction product under superatmospheric pressure and at a temperature above about 100° C. to produce a chlorocarboxylic acid.

8. Process for the production of a chlorocarboxylic acid from a cyclic ketone, which comprises producing a reaction product containing a lactone and sulfuric acid by adding a ketone which is an oxo-substituted hydrocarbon having its keto carbonyl group in a cycloparaffinic ring of 5 to 7 carbon atoms to an aqueous mixture of excess hydrogen peroxide and sulfuric acid, said mixture being maintained at a temperature of at least 30° C. and containing throughout said addition no more than 40% by volume of water, based on the total volume of water, hydrogen peroxide and sulfuric acid, and at least about 10%, based on the weight of said aqueous mixture, of a lactone-containing mixture produced by the oxidation of said ketone with aqueous sulfuric acid and hydrogen peroxide, eliminating the excess peroxide by addition of gaseous sulfur dioxide, mixing said reaction product with hydrochloric acid and heating the resulting mixture under autogenous superatmospheric pressure to a temperature of 100 to 170° C. to produce a chlorocarboxylic acid.

9. Process for the production of 6-chlorocaproic acid from cyclohexanone which comprises oxidizing the cyclohexanone with an aqueous mixture of hydrogen peroxide and sulfuric acid to produce a reaction product containing caprolactone and sulfuric acid, the reactants being maintained at a temperature of at least about 30° C. during the mixing of said cyclohexanone, hydrogen peroxide and sulfuric acid, and reacting hydrochloric acid with said reaction product to produce 6-chlorocaproic acid.

10. Process for the production of 6-chlorocaproic acid from cyclohexanone which comprises producing a reaction product containing caprolactone and sulfuric acid by adding cyclohexanone gradually to a mixture of excess hydrogen peroxide and sulfuric acid, said mixture containing about 1 part by volume of an about 30–50% aqueous solution of hydrogen peroxide and about 2 parts by volume of sulfuric acid, said addition being made at a temperature of at least about 30° C., eliminating the excess peroxide and reacting hydrochloric acid with said reaction product to produce 6-chlorocaproic acid.

11. Process for the production of 6-chlorocaproic acid from cyclohexanone which comprises oxidizing cyclohexanone with an aqeous mixture of hydrogen peroxide and sulfuric acid to produce a reaction product containing caprolactone and sulfuric acid, the reactants being maintained at a temperature of at least about 30° C. during the mixing of said cyclohexanone, hydrogen peroxide and sulfuric acid, reacting hydrochloric acid at a temperature of at least about 100° C. under superatmospheric pressure and in liquid phase with said reaction product to produce 6-chlorocaproic acid and separating a layer containing 6-chlorocaproic acid from the resulting product.

12. Process for the production of 6-chlorocaproic acid from cyclohexanone which comprises producing a reaction product containing caprolactone and sulfuric acid by adding cyclohexanone gradually to a mixture of an excess of a 20% to 60% aqueous hydrogen peroxide solution and concentrated sulfuric acid at a temperature of 30 to 45° C., adding gaseous sulfur dioxide to eliminate excess peroxide, and reacting said reaction product with hydrochloric acid at a temperature of at least about 100° C. under autogenous pressure in a closed vessel and in liquid phase.

References Cited in the file of this patent

UNITED STATES PATENTS

| | | |
|---|---|---|
| 1,799,536 | Ruzicka | Apr. 7, 1931 |
| 2,449,993 | Gresham et al. | Sept. 28, 1948 |

OTHER REFERENCES

Mellor: "Modern Inorg. Chem.," pp. 473–4, Longmans (1939).

Westerfeld: J. Biol. Chem. 143, pages 177–178; 182 (1942).

Baeyer et al.: Berichte 33, pages 124–125 (1900).

Latimer and Hildebrand: "Reference Book of Inorganic Chemistry," The Macmillan Co., New York (3rd ed., 1951) page 264.

Emmert: Berichte 40, page 914 (1907).

Wohlgemuth: Compt. Rendus 158, page 1577 (1914).

Lowry: "Inorganic Chemistry," 2nd ed. (1931), page 396.

Houben: "Methoden der Organischen Chemie" (Leipzig, 1922), vol. 2, page 51.

Bayer et al.: Berichte der deutsch. Chem. (1899), vol. 32, pages 3625–3633.

Fling et al.: J. A. C. S. 69, 2466–7 (1947).

Heine et al.: J. A. C. S. 73, 1361–1362 (1952).